April 16, 1963     W. ROCKE     3,085,576
HYDROTHERAPY APPARATUS
Filed Feb. 1, 1960
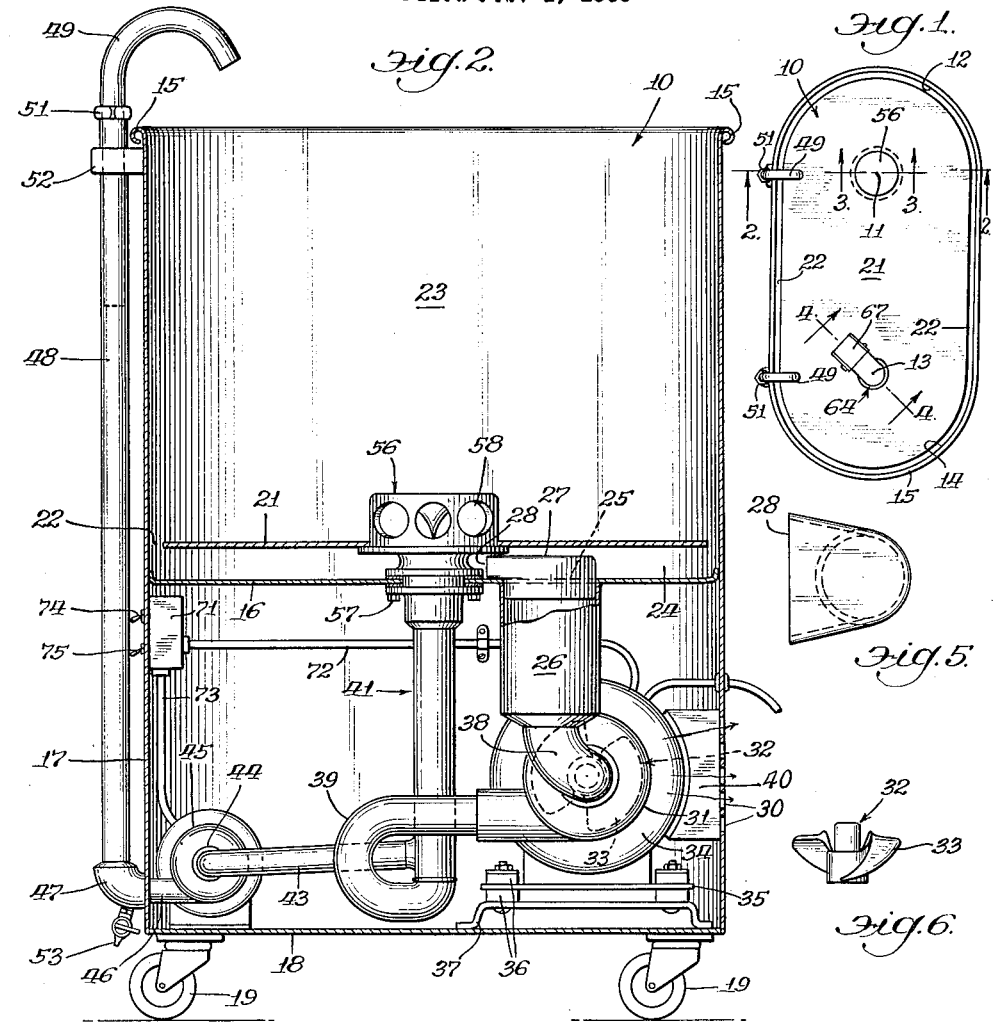
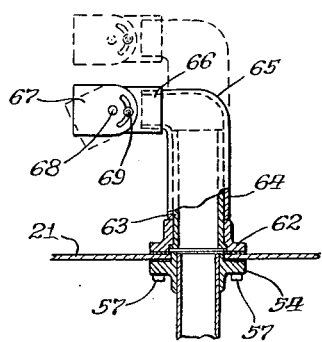
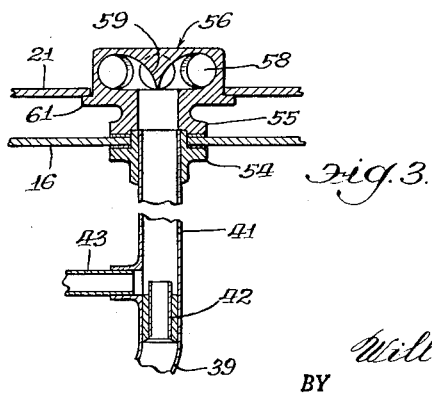
INVENTOR.
William Rocke
BY
L. F. Hammond.
Atty.

United States Patent Office 3,085,576
Patented Apr. 16, 1963

3,085,576
HYDROTHERAPY APPARATUS
William Rocke, P.O. Box 623, Bloomington, Ill.
Filed Feb. 1, 1960, Ser. No. 6,044
9 Claims. (Cl. 128—369)

This invention relates to hydrotherapy apparatus and has, as its primary object, the provision of a hydrotherapy bath having an improved circulatory system whereby it produces a greater degree of turbulence and more effective treatment than prior machines, yet in a more gentle manner, with minimum discomfort to the patient.

A closely related object of the invention is the provision of an improved circulatory system whereby greater, yet more uniform turbulence and aeration can be achieved at all levels within the treatment compartment of the tank, yet wherein this circulation and aeration may be achieved by the consumption of less power and with smaller and less expensive motors and pumps than required by conventional equipment.

The simultaneous accomplishment of these aims by the present invention is due, in part at least, to the fact that the present invention accomplishes greater aeration of the liquid employed in the treatment compartment of the bath than accomplished by prior types of apparatus, yet accomplishes these results without introduction of appreciable amounts of air into the circulating pumps of the system.

It may be explained that while hydrotherapy has long been recognized as a valuable form of treatment for various types of injuries and disorders, yet the equipment available heretofore has been subject to several shortcomings, particularly in that they have often failed to maintain uniformity of turbulence throughout the area of treatment, or because they have been overly violent in the direct stream of fluid flow, even while failing to achieve the therapeutic effect.

It is a specific object of the present invention to provide an improved circulatory system whereby the water passing through the circulatory pump of the device is substantially free of air although the turbulent water in the tank of the device is aerated to a greater degree than in types of apparatus heretofore available.

A further object of the invention is to provide means whereby the aerated fluid in the tank of the apparatus is separated from the air therein prior to being introduced into the circulating pump of the apparatus, together with means whereby pure water discharged from the circulating pump is subjected to a high degree of aeration before entering the turbulence chamber of the apparatus.

The manner in which the foregoing objects are accomplished is best described in connection with the drawings of the following specification, wherein:

FIGURE 1 is a plan view of a typical hydrotherapy bath as contemplated by the present invention;

FIGURE 2 is a sectional view thereof taken substantially on the plane of the line 2—2 of FIGURE 1;

FIGURE 3 is a detail sectional view of the air injector and one form of fluid outlet fitting utilized by the present invention, the view being taken on the line 3—3 of FIGURE 1;

FIGURE 4 is a partial sectional view of another type of outlet fitting, the view being taken on the line 4—4 of FIGURE 1;

FIGURE 5 is a plan view of the drain fitting of the device; and

FIGURE 6 is a side elevational view of a preferred form of liquid impeller employed in the circulating pump of the apparatus.

The principles of the present invention will be described in connection with a hydrotherapy bath which may comprise a cylindrical tub or which may consist of an elongated tank 10 of the oval outline illustrated in FIGURE 1.

Conventionally, a single circulatory system is used in a round tank, while two similar circulatory systems may be employed to advantage in the oblong tank, with one system having a water outlet at the center of curvature 11 of the end walls 12 of the tank, while the other may include an identical or modified outlet fitting preferably positioned at the center 13 of the opposite arcuate wall 14 of the tank. The upright walls of the tank extend from a rim 15 at the top of the tank to a generally horizontal bottom plate 16 which may be welded or otherwise secured to the inner surfaces of the walls. As shown, the walls extend thence downwardly to provide skirt portions 17 terminating in a bottom frame 18 on which casters 19 may be mounted to provide for maximum portability and convenience in handling the equipment.

The tank 10 is also provided with a horizontal separator plate or baffle 21 which is imperforate throughout most of its surface but which terminates short of the side walls of the tank to provide restricted annular channels 22 through which water may flow downwardly from a turbulent fluid chamber 23 in which it is contemplated that the therapeutic treatment shall take place, to a lower chamber 24 which may be termed a quiescent fluid chamber in which there is little turbulence and in which the water will be substantially free of aeration as will appear. The bottom 16 of the tank is provided with a drain opening 25 by which it is interconnected by a relatively large cylindrical reservoir or sump 26 to prevent pump suction at the outlet from tank bottom 16 and, as illustrated, a drain fitting 27 is inserted in the aperture 25 and provided with a flared into 28 (FIGURE 5), directed toward the center of the tank so that liquid flowing into the sump container 26 is taken from an area quite remote from the annular channels 22 about the plate 21.

Circulation of the liquid throughout the apparatus is caused by a pump 31 having within its housing a rotary impeller 32 having spirally curved blades 33 (FIGURE 6) and mounted on the armature shaft of a motor 34 carried on a bracket 35 which is supported by resilient mounting devices 36 on a base frame 37. The pump 31 includes an inlet conduit 38 extending from the lower end of the sump 26 to the inlet aperture of the pump housing and an outlet duct 39 extending from the outlet connection of the pump housing to the lower end of a vertical air injector tube 41. A cooling vent or "chimney" 40 is provided between the motor 34 and the housing walls, and vent openings 30 are provided in the walls to aid in cooling the motor.

The air injector, best seen in FIGURES 2 and 3, includes the relatively large diameter exterior tube 41 provided with an internal water nozzle 42 of reduced diameter with respect to the water duct 39 to which it is connected and positioned concentrically at the lower end of the tube 41. An air inlet conduit 43 extends to the lower end of the tube 41, centering with the nozzle 42 (FIGURE 3) to an inlet fitting 44 of a centrifugal drain pump 45. The discharge fitting 46 of the drain pump is connected through an elbow 47 to a riser tube 48 positioned outside of the tank and terminating in a reversely bent adjustable spout 49. The spout 49 may be adjusted vertically and may be directed either into the tank 10 or outwardly therefrom and held in any desired position by packing nut 51. The assembly of the riser tube 48 and the spout 49 is held in upright position by a fitting 52 secured to the upper wall of the tank near the rim 15 thereof. A drain petcock 53 is provided in the elbow 47 of the drain pump outlet.

The upper end of the air injector tube 41 extends through a flanged fitting 54 which cooperates with the flange 55 of a water discharge fitting 56 to provide the water and air inlet at the center of the tank. Appropriate gaskets are provided to prevent leakage and the flanges 54, 55 are drawn together by bolts or cap screws 57. The water discharge fitting 56 has a plurality of radially directed outlet apertures 58 and includes a pointed internal deflector 59 by which the stream of aerated fluid rising from the injector tube 41 is thrown outwardly and caused to pass through the apertures 58 freely and without appreciable back pressure. The outlet fitting 56 also preferably includes a peripheral flange 61 on which the central area of separator plate 21 may rest, while additional supports (not shown) may be provided for its outer edges.

A modified form of the fluid outlet fitting is illustrated in FIGURE 4 of the drawings and, as indicated in FIGURE 1, this modified outlet fitting may be used on the outlet of one circulatory system of the machine, while a fitting such as indicated at 56 is utilized on the system employed at the other end of the tank. The modified fitting comprises a flange 62 which may be bolted to the flange 54 by cap screws 57, as heretofore indicated, with the flange 62 providing a mounting for a stationary upright pipe 63 over which a vertically slidable and rotatable conduit 64 is telescoped. The upper end of the conduit 64 is bent laterally at 65 and provided with a head portion 66 having a deflector 67 pivoted thereon at 68 and provided with a set screw 69 to hold it in properly adjusted position.

As will be observed from FIGURE 2, the pumps 31 and 45, together with their driving motors and the essential fluid conduits of the apparatus, are enclosed and hidden from view within the skirt portion 17 of the tank, which also provides mounting means for a switch box 71 and electric conduits 72 and 73 whereby the switches 74 and 75 may control the operation of the apparatus.

Prior to using the apparatus, the tank 10 is partially filled with water of the desired temperature. This may be done by any convenient means (not shown). The operation of the apparatus is then begun by closing one of the switches 74, 75 to energize the motor 34 driving the pump impeller 32. The pump delivers a large volume of water at high velocity through the outlet duct 39 to the internal water nozzle 42 which effects a venturi action, causing air to be drawn inwardly through spout 49, through pipes 48, 47 and 46, through the centrifugal pump 45 and thence inwardly through the duct 43 to the air injector tube 41. It will be understood that since the pump 45 is idle, the air may flow freely through it. Thus a mixture of air and water is caused to flow upwardly in the tube 41 and is projected laterally through the outlet apertures 58 of the fitting 56, just above the upper surface of separator plate 21. It follows that an extremely large volume of water and air is discharged into the chamber 23 imparting a high degree of aeration and turbulence to the water within the chamber, yet without the force or impact of a jet stream composed entirely of liquid.

It is essential, however, in order to obtain the most efficient circulatory action, that most or all of the air entrained in the water be removed before it is recirculated through the pump 31. The removal of air is accomplished, first, by the separator plate 21 which allows water to flow into the quiescent fluid chamber 24 only through the restricted passageway 22, and secondly, by the oversize sump 26 and flared inlet fitting 28 which build up a head of pure, relatively quiet water above the pump inlet conduit 38. As a result, the fluid circulated through the pump and its conduits is almost pure water, notwithstanding that the fluid within the turbulence chamber 23 contains an exceedingly large volume of entrained air.

To drain the apparatus, no valves need be operated. Instead, it is only necessary to energize pump 45 and swing the drain spout 49 outwardly from the position shown, in a convenient manner to direct fluid emitted from the spout into a set tub, lavatory, or other available receptacle.

From the foregoing it will be apparent that the teachings of the present invention provide an improved hydrotherapy bath wherein the liquid being directed into the treatment chamber of the tank is first passed through an air injector in a manner to become highly aerated, yet in which the air contained in the return flow of liquid is separated therefrom above the quiescent chamber 24 and the sump 26 so that the liquid fed to the impeller of the pump 31 is relatively free of air. It has been found that this makes for greatest efficiency in operation, permitting maximum agitation of the water in the tank, yet by the expenditure of minimum power, and in such a way that maximum therapeutic benefits are obtained.

Having thus described the invention, what I claim as new and desire to protect by United States Letters Patent is:

1. Hydrotherapy apparatus comprising, in combination, an open topped tank including generally upright side walls and a generally horizontal bottom, the side walls of the tank extending downwardly beyond the bottom thereof to support the tank and to provide an enclosure for mechanism associated therewith; a separator plate comprising a horizontal baffle spaced above the bottom of the tank to divide the interior thereof into a quiescent fluid chamber below the baffle and a turbulent fluid chamber thereabove, said separator plate being spaced from the upright walls of the tank around its peripheral edges to provide narrow restricted passages adjacent the tank walls and interconnecting said chambers; a drain aperture in the bottom of the tank located at a position beneath the separator plate and remote from said restricted passages; a sump comprising a relatively large liquid container below the quiescent fluid chamber to prevent pump suction at the outlet from said chamber and connected thereto by the aforementioned drain; a liquid inlet line extending from the sump to a circulating pump consisting of a motor driven rotary impeller having spirally curved blades enclosed within a housing having inlet and outlet fittings thereon, an outlet duct from said circulating pump extending to an air injector consisting of an upright nozzle and a horizontal conduit inlet of same diameter reduced in diameter with respect to the outlet duct of the pump and positioned substantially below the bottom of the tank, with and aerating tube of diameter substantially greater than the diameter of the nozzle extending directly upwardly therefrom through the bottom of the tank and the separator plate thereof and terminating in an outlet fitting having deflecting means to direct the flow of aerated fluid laterally above the surface of the separator plate, said injector including an air inlet passage entering the injector tube centering with the aforementioned nozzle, an air supply duct extending from said inlet passage to a point above the fluid level of the tank; and a motor driven centrifugal pump in said air supply duct whereby the air supply duct may function as a power operated drain for the apparatus.

2. Hydrotherapy apparatus comprising, in combination, an open topped tank including generally upright side walls and a generally horizontal bottom, a separator plate comprising a horizontal baffle spaced above the bottom of the tank to divide the interior thereof into a quiescent fluid chamber below the baffle and a turbulent fluid chamber thereabove, said separator plate being spaced from the upright walls of the tank around its peripheral edges to provide narrow restricted passages adjacent the tank walls and interconnecting said chambers; a drain aperture in the bottom of the tank located at a position beneath the separator plate and remote from said restricted passages; a sump comprising a relatively large liquid container below the quiescent fluid chamber to prevent pump suction at the outlet from said chamber and connected thereto by the aforementioned drain; a liquid inlet line extending from the sump to a circulating pump consisting of a motor driven rotary impeller enclosed within a housing having inlet and outlet fittings thereon, an outlet duct from said circulating pump extending to an air injector consisting of an upright nozzle and a horizontal conduit inlet of same diameter reduced in diameter with respect to the outlet duct of the pump and positioned substantially below the bottom of the tank, an aerating tube of diameter substantially greater than the diameter of the nozzle extending directly upwardly therefrom through the bottom of the tank and the separator plate thereof and terminating in an outlet fitting having deflecting means to direct the flow of aerated fluid laterally above the surface of the separator plate, said injector including an air inlet passage entering the injector tube centering with the aforementioned nozzle, an air supply duct extending from said inlet passage to a point above the fluid level of the tank.

3. Hydrotherapy apparatus comprising, in combination, an open topped tank including generally upright side walls and a generally horizontal bottom, the side walls of the tank extending downwardly beyond the bottom thereof to support the tank and to provide an enclosure for mechanism associated therewith; a separator plate comprising a horizontal baffle spaced above the bottom of the tank to divide the interior thereof into a quiescent fluid chamber below the baffle and a turbulent fluid chamber thereabove, restricted passages interconnecting said chambers; a drain aperture in the bottom of the tank located at a position beneath the separator plate and remote from said restricted passages; a sump comprising a relatively large liquid container below the quiescent fluid chamber to prevent pump suction at the outlet from said chamber and connected thereto by the aforementioned drain; a liquid inlet line extending from the sump to a circulating pump consisting of a motor driven rotary impeller having spirally curved blades enclosed within a housing having inlet and outlet fittings thereon, an outlet duct from said circulating pump extending to an air injector consisting of an upright nozzle and a horizontal air inlet, both of the same diameter reduced in diameter with respect to the outlet duct of the pump and positioned substantially below the bottom of the tank, an aerating tube of diameter substantially greater than the diameter of the nozzle extending directly upwardly therefrom through the bottom of the tank and the separator plate thereof and terminating in an outlet fitting having deflecting means to direct the flow of serated fluid laterally above the surface of the separator plate, said injector including an air inlet passage entering the injector tube centering with the aforementioned nozzle, an air supply duct extending from said inlet passage to a point above the fluid level of the tank; and a motor driven centrifugal pump in said air supply duct whereby the air supply duct may function as a power operated drain for the apparatus.

4. Hydrotherapy apparatus comprising, in combination, an open topped tank including generally upright side walls and a generally horizontal bottom, a separator plate comprising a horizontal baffle spaced above the bottom of the tank to divide the interior thereof into a quiescent fluid chamber below the baffle and a turbulent fluid chamber thereabove, restricted passages interconnecting said chambers; a drain aperture in the bottom of the tank located at a position beneath the separator plate and remote from said restricted passages; a sump comprising a relatively large liquid container below the quiescent fluid chamber section to prevent pump suction at the outlet from said chamber and connected thereto by the aforementioned drain; a liquid inlet line extending from the sump to a circulating pump consisting of a motor driven rotary impeller enclosed within a housing having inlet and outlet fittings thereon, an outlet duct from said circulating pump extending to an air injector consisting of an upright nozzle and a horizontal conduit inlet of same diameter reduced in diameter with respect to the outlet duct of the pump positioned substantially below the bottom of the tank, an aerating tube of diameter substantially greater than the diameter of the nozzle extending directly upwardly therefrom through the bottom of the tank and the separator plate thereof and terminating in an outlet fitting having deflecting means to direct the flow of aerated fluid laterally above the surface of the separator plate, said injector including an air inlet passage entering the injector tube centering with the aforementioned nozzle, an air supply duct extending from said inlet passage to a point above the fluid level of the tank.

5. Hydrotherapy apparatus comprising, in combination, an open topped tank including generally upright side walls and a generally horizontal bottom, a separator plate comprising a horizontal baffle spaced above the bottom of the tank to divide the interior thereof into a quiescent fluid chamber below the baffle and a turbulent fluid chamber thereabove, said separator plate being spaced from the upright walls of the tank around its peripheral edges to provide narrow restricted passages adjacent the tank walls and interconnecting said chambers; liquid inlet passages extending from the quiescent fluid chamber to a circulating pump consisting of a motor driven rotary impeller having spirally curved blades enclosed within a housing having inlet and outlet fittings thereon, an outlet duct from said circulating pump extending to an air injector consisting of an upright nozzle and a horizontal conduit inlet of same diameter reduced in diameter with respect to the outlet duct of the pump and positioned substantially below the bottom of the tank and the separator plate thereof and terminating in an outlet fitting having deflecting means to direct the flow of aerated fluid laterally above the surface of the separator plate, said injector including an air inlet passage entering the injector tube centering with the aforementioned nozzle outlet, an air supply duct extending from said inlet passage to a motor driven centrifugal pump whereby the air supply duct may function as a power operated drain for the apparatus.

6. Hydrotherapy apparatus comprising, in combination, an open topped tank including generally upright side walls and a generally horizontal bottom, a separator plate to divide the interior thereof into a quiescent fluid chamber below the baffle and a turbulent fluid chamber thereabove, liquid inlet passages extending from the quiescent fluid chamber to a circulating pump consisting of a motor driven rotary impeller having spirally curved blades enclosed within a housing having inlet and outlet fittings thereon, an outlet duct from said circulating pump extending to an air injector consisting of an upright nozzle and a horizontal conduit inlet of same diameter reduced in diameter with respect to the outlet duct of the pump and positioned substantially below the bottom of the tank and the separator plate thereof and terminating in an outlet fitting having deflecting means to direct the flow of aerated fluid laterally above the surface of the separator plate, said injector including an air inlet passage entering the injector tube centering with the aforementioned nozzle, an air supply duct extending from said inlet passage to a motor driven centrifugal pump whereby the air supply duct may function as a power operated drain for the apparatus.

7. Hydrotherapy apparatus comprising, in combination, an open topped tank including generally upright side walls and a generally horizontal bottom, the side walls of the tank extending downwardly beyond the bottom thereof to support the tank and to provide an enclosure for mechanism associated therewith; a drain aperture in the bottom of the tank, a sump comprising a relatively large liquid container to prevent pump suction at tank outlet, connected with the aforementioned drain; a liquid inlet line extending from the sump to a circulating pump consisting of a motor driven rotary impeller having spirally curved blades enclosed within a housing having inlet and outlet fittings thereon, an outlet duct from said circulating pump extending to an air injector consisting of an upright nozzle and a horizontal conduit inlet of same diameter reduced in diameter with respect to the outlet duct of the pump and positioned substantially below the bottom of the tank and centrally thereof, an aerating tube of diameter substantially greater than the diameter of the nozzle extending directly upwardly therefrom through the bottom of the tank and terminating in a radial outlet fitting having deflecting means to direct the flow of aerated fluid laterally, said injector including an air inlet passage entering the injector tube centering with the aforementioned nozzle, an air supply duct extending from said inlet passage to a point above the fluid level of the tank; and a motor driven centrifugal pump in said air supply duct whereby the air supply duct may function as a power operated drain for the apparatus.

8. Hydrotherapy apparatus comprising, in combination, an open topped tank including generally upright side walls and a generally horizontal bottom; a drain aperture in the bottom of the tank, a sump comprising a relatively large liquid container to prevent pump suction at tank bottom connected with the aforementioned drain; a liquid inlet line extending from the sump to a circulating pump consisting of a motor driven rotary impeller having spirally curved blades enclosed within a housing having inlet and outlet fittings thereon, an outlet duct from said circulating pump extending to an air injector consisting of an upright nozzle and a horizontal conduit inlet of same diameter reduced in diameter with respect to the outlet duct of the pump and positioned substantially below the bottom of the tank and centrally thereof, an aerating tube of diameter substantially greater than the diameter of the nozzle extending directly upwardly therefrom through the bottom of the tank and terminating in a radial outlet fitting having deflecting means to direct the flow of aerated fluid laterally, said injector including an air inlet passage entering the injector tube centering with the aforementioned nozzle.

9. Hydrotherapy apparatus comprising, in combination, an open topped tank including generally upright side walls and a generally horizontal bottom; a separator plate comprising a horizontal baffle spaced above the bottom of the tank to divide the interior thereof into a quiescent fluid chamber below the baffle and a turbulent fluid chamber thereabove, said separator plate being spaced from the upright walls of the tank around its peripheral edges to provide narrow restricted passages adjacent the tank walls and interconnecting said chambers; an air injector consisting of a source of fluid under pressure interconnected with an upright nozzle positioned substantially below the bottom of the tank and centrally thereof, an aerating tube of diameter substantially greater than the diameter of the nozzle extending directly upwardly therefrom through the bottom of the tank and the separator plate thereof and terminating in a radial outlet fitting having deflecting means to direct the flow of aerated fluid laterally above the surface of the separator plate, said injector including an air inlet passage entering the injector tube centering with the aforementioned nozzle.

References Cited in the file of this patent

UNITED STATES PATENTS

| | | |
|---|---|---|
| 964,779 | Holaday | July 19, 1910 |
| 1,101,804 | Lauter | June 30, 1914 |
| 1,526,179 | Parr | Feb. 10, 1925 |
| 2,091,167 | Solley | Aug. 24, 1937 |
| 2,312,524 | Cox | Mar. 2, 1943 |
| 2,509,130 | Burks | May 23, 1950 |
| 2,614,498 | Piccardo | Oct. 21, 1952 |
| 2,730,104 | Newman | Jan. 10, 1956 |
| 2,738,787 | Jacuzzi | Mar. 20, 1956 |